(12) United States Patent
Tamura et al.

(10) Patent No.: US 8,986,182 B2
(45) Date of Patent: Mar. 24, 2015

(54) PAPER FEED ROLLER

(75) Inventors: Toshihiro Tamura, Kobe (JP); Akihiro Mine, Kobe (JP); Hirokazu Nishimori, Kobe (JP); Hideyuki Okuyama, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 461 days.

(21) Appl. No.: 12/841,419

(22) Filed: Jul. 22, 2010

(65) Prior Publication Data

US 2011/0034308 A1    Feb. 10, 2011

(30) Foreign Application Priority Data

Aug. 10, 2009    (JP) ................. 2009-185746

(51) Int. Cl.
     *F16C 13/00*    (2006.01)
     *B65H 5/06*    (2006.01)
     *B65H 27/00*    (2006.01)

(52) U.S. Cl.
     CPC ..... *F16C 13/00* (2013.01); *B65H 5/06* (2013.01); *B65H 27/00* (2013.01)
     USPC .................... 492/59; 492/53; 492/48; 492/56

(58) Field of Classification Search
     CPC ........ B65H 27/00; B65H 3/06; B65H 3/0638; B65H 5/06; B65H 5/066; F16C 13/00
     USPC ......................... 492/48, 53, 56, 59
See application file for complete search history.

(56) References Cited

U.S. PATENT DOCUMENTS

| | | | |
|---|---|---|---|
| 5,516,857 A | | 5/1996 | Mann |
| 5,723,214 A | * | 3/1998 | Yamazaki et al. ............ 428/364 |
| 6,476,140 B2 | * | 11/2002 | Hattori et al. ................ 525/191 |
| 6,602,957 B2 | * | 8/2003 | Hattori et al. ................ 525/191 |
| 6,793,611 B2 | * | 9/2004 | Hattori et al. ................... 492/56 |
| 6,919,401 B2 | * | 7/2005 | Mabuchi et al. .............. 524/500 |
| 7,169,851 B2 | * | 1/2007 | Ikeda ............................. 525/89 |
| 7,253,233 B2 | * | 8/2007 | Sugimoto et al. ............... 525/89 |
| 7,367,554 B2 | * | 5/2008 | Mine et al. .................... 271/109 |
| 7,374,527 B2 | * | 5/2008 | Minagoshi ...................... 492/30 |
| 7,448,610 B2 | * | 11/2008 | Ito et al. ........................ 271/109 |
| 7,728,060 B2 | * | 6/2010 | Minagoshi et al. ............ 524/167 |
| 7,744,781 B2 | * | 6/2010 | Tajima et al. ............ 252/519.33 |
| 7,866,657 B2 | * | 1/2011 | Mine et al. .................... 271/109 |

(Continued)

FOREIGN PATENT DOCUMENTS

| CN | 1552578 A | 12/2004 |
|---|---|---|
| CN | 1715331 A | 1/2006 |

(Continued)

OTHER PUBLICATIONS

Machine English translation of JP 08041283.*

(Continued)

*Primary Examiner* — Essama Omgba
(74) *Attorney, Agent, or Firm* — Birch, Stewart, Kolasch & Birch, LLP (57) ABSTRACT

The paper feed roller according to the present invention is made of a thermoplastic elastomer composition containing an ester thermoplastic elastomer urethane or an ether thermoplastic elastomer urethane (E) having microrubber hardness (type A) of not less than 60 and not more than 80 and a plasticizer (P) in a mass ratio E/P of 70/30 to 50/50.

7 Claims, 1 Drawing Sheet

(56) References Cited

U.S. PATENT DOCUMENTS

| | | | |
|---|---|---|---|
| 2002/0013203 A1* | 1/2002 | Hattori et al. | 492/53 |
| 2002/0049297 A1 | 4/2002 | Suzuki et al. | |
| 2003/0060566 A1* | 3/2003 | Hattori et al. | 525/70 |
| 2003/0065094 A1* | 4/2003 | Nitta et al. | 525/89 |
| 2003/0118813 A1* | 6/2003 | Hattori et al. | 428/364 |
| 2004/0082725 A1* | 4/2004 | Mabuchi et al. | 525/326.1 |
| 2004/0102599 A1 | 5/2004 | Kaufhold et al. | |
| 2004/0192525 A1* | 9/2004 | Nitta et al. | 492/20 |
| 2004/0225061 A1* | 11/2004 | Sugimoto et al. | 525/89 |
| 2004/0260006 A1* | 12/2004 | Mabuchi et al. | 524/502 |
| 2005/0202209 A1 | 9/2005 | Okuda et al. | |
| 2005/0230904 A1* | 10/2005 | Mine et al. | 271/121 |
| 2005/0245682 A1 | 11/2005 | Ikeda | |
| 2006/0082042 A1 | 4/2006 | Ito et al. | |
| 2007/0111873 A1* | 5/2007 | Ito et al. | 492/56 |
| 2007/0244285 A1* | 10/2007 | Minagoshi | 526/335 |
| 2008/0042108 A1* | 2/2008 | Tajima et al. | 252/500 |
| 2008/0071028 A1* | 3/2008 | Minagoshi et al. | 525/108 |
| 2009/0176917 A1 | 7/2009 | Lubker et al. | |
| 2010/0295239 A1* | 11/2010 | Mine et al. | 271/18 |
| 2011/0034598 A1* | 2/2011 | Tamura et al. | 524/147 |
| 2011/0130259 A1* | 6/2011 | Ito et al. | 492/59 |
| 2011/0306481 A1* | 12/2011 | Mine et al. | 492/59 |
| 2014/0042691 A1* | 2/2014 | Mine et al. | 271/264 |
| 2014/0087932 A1* | 3/2014 | Ito et al. | 492/59 |
| 2014/0296049 A1* | 10/2014 | Mine et al. | 492/28 |

FOREIGN PATENT DOCUMENTS

| | | | | |
|---|---|---|---|---|
| CN | 1760100 A | | 4/2006 | |
| CN | 101033568 A | | 9/2007 | |
| JP | 5-8873 A | | 1/1993 | |
| JP | 5-125142 A | | 5/1993 | |
| JP | 5-154943 A | | 6/1993 | |
| JP | 5-221569 A | | 8/1993 | |
| JP | 05221569 A | * | 8/1993 | B65H 27/00 |
| JP | 08041283 A | * | 2/1996 | C08L 53/02 |
| JP | 2001055491 A | * | 2/2001 | C08L 67/00 |
| JP | 2002-356531 A | | 12/2002 | |
| JP | 2003-2481 A | | 1/2003 | |
| JP | 2004-51249 A | | 2/2004 | |
| JP | 2004-299842 A | | 10/2004 | |
| JP | 2004315706 A | * | 11/2004 | C08L 53/02 |
| JP | 2007-137539 A | | 6/2007 | |
| JP | 2008-114935 A | | 5/2008 | |
| JP | 2008-254845 A | | 10/2008 | |
| JP | 2008-280144 A | | 11/2008 | |
| JP | 2011037563 A | * | 2/2011 | B65H 5/06 |
| JP | 2011037564 A | * | 2/2011 | B65H 5/06 |

OTHER PUBLICATIONS

Elastollan Thermoplastic Polyurethane Elastomers, BASF Japan Ltd.; pp. 8-13.
Search Report dated Feb. 8, 2014 for Chinese Application No. 201010217874.4.
http://chem.sis.nim.nih.gov/chemidplus/rn/27138-31-4.
http://www.guidechem.com/dictionary/27138-31-4.html.
Plasticizers in Millathane 76; Technical Information for Performance Solutions; TSE Industries; vol. 4, Issue 4; Dec. 2007.

* cited by examiner

PAPER FEED ROLLER

BACKGROUND OF THE INVENTION

1. Field of the Invention

The present invention relates to a paper feed roller employed for paper feeding in an electrostatic copier or a printer.

2. Description of Related Art

A paper feed roller is built in a paper feed mechanism provided in an apparatus such as an electrostatic copier, a laser beam printer, a plain paper facsimile, an ink jet printer or an automatic teller machine (ATM), for example. The paper feed roller includes a feed roller, a transport roller, a platen roller or a paper discharge roller rotating in contact with papers (including plastic films or the like: this also applies to the following description) for transporting the papers by friction.

In general, a rubber roller made of natural rubber, urethane rubber, ethylene-propylene-diene rubber (EPDM), polynorbornene rubber, silicone rubber, chlorinated polyethylene rubber or the like, for example, is employed as the paper feed roller.

The outer peripheral surface of the paper feed roller coming into contact with the papers may be roughened, knurled or embossed, in order to achieve excellent paper feeding by increasing the friction coefficient with respect to the papers. However, the outer peripheral surface subjected to such processing is so easily abraded that the friction coefficient may be reduced due to abrasion upon repetitive contact with the papers, to result in defective transportation of the papers in a relatively early stage.

In recent years, papers containing a large quantity of low-priced extender such as calcium carbonate or talc and a low-priced sizing agent (bleeding inhibitor) prepared from aliphatic hydrocarbon for reducing the cost have been on the market as papers for the aforementioned apparatus. In such papers, however, a large quantity of paper dust results mainly from the calcium carbonate or talc, and easily adheres to the outer peripheral surface of the paper feed roller. Thus, the friction coefficient of the paper feed roller may be reduced due to the adhesion of the paper dust, to cause defective transportation of the papers in a relatively early stage.

Various studies have been made in order to prevent such adhesion of the paper dust. For example, Patent Document 1 (Japanese Unexamined Patent Publication No. 5-125142 (1993)) describes that adhesion of paper dust resulting from static electricity can be suppressed by reducing electric resistance of a paper feed roller. Patent Document 2 (Japanese Unexamined Patent Publication No. 2003-2481) describes that adhesion of paper dust can be suppressed by adding a flaky filler into rubber forming a paper feed roller. Patent Document 3 (Japanese Unexamined Patent Publication No. 2004-299842) describes that adhesion of paper dust can be suppressed by embossing the outer peripheral surface of a paper feed roller and finely irregularizing the embossed outer peripheral surface.

SUMMARY OF THE INVENTION

According to any of the aforementioned countermeasures, however, the paper dust cannot be sufficiently prevented from adhering to the outer peripheral surface of the paper feed roller.

According to a study made by the inventors, paper dust adheres to the outer peripheral surface of the paper feed roller through the sizing agent prepared from aliphatic hydrocarbon. Further, natural rubber, EPDM, butyl rubber or the like most generally employed for forming the paper feed roller has an SP value (solubility parameter) close to that of the aliphatic hydrocarbon, leading to such high affinity that the aliphatic hydrocarbon contained in the papers easily adheres to the outer peripheral surface of the paper feed roller due to friction between the paper feed roller and the papers. Further, the paper dust easily adheres to the outer peripheral surface through the aliphatic hydrocarbon, and the friction coefficient with respect to the papers is reduced in a short period due to the adhesion. The aliphatic hydrocarbon itself singly functions as an excellent lubricant, to reduce the friction coefficient.

Therefore, the inventors have made deep studies for forming the paper feed roller by a thermoplastic elastomer urethane having an SP value remarkably different from that of aliphatic hydrocarbon with such low affinity that the aliphatic hydrocarbon and paper dust hardly adhere thereto and having superior mechanical strength such as abrasion resistance as compared with the conventional rubber.

Urethane elastomers are roughly classified into a "cast type" urethane elastomer prepared by feeding a liquid material into a mold and solidifying the same into a prescribed shape by crosslinking, a "millable type" urethane elastomer prepared by milling a solid material similarly to general rubber, working the same into a prescribed shape and thereafter crosslinking the same, and a "thermoplastic type" urethane elastomer.

A thermoplastic polyurethane elastomer (thermoplastic elastomer urethane) generally contains a hard segment having a polyurethane structure and a soft segment having a polyester or polyether structure in the molecules. The soft segment performs soft plastic deformation, while the hard segment prevents (restrains) the plastic deformation similarly to a crosslinking point of vulcanized rubber.

Due to the actions of the soft and hard segments, the thermoplastic elastomer urethane allows fusion molding by injection molding or extrusion molding similarly to general thermoplastic resin, while exhibiting rubber elasticity similar to that of vulcanized rubber. In injection molding, a thermoplastic elastomer composition (may hereinafter be abbreviated as "TPU") prepared by blending a plasticizer etc. into a thermoplastic elastomer urethane can be molded into a prescribed shape by injecting the same into a mold in a state heated to not less than the melting point or the glass transition temperature thereof to be fused and thereafter solidifying the same by cooling. In extrusion molding, the fused TPU can be molded into an elongated product having a prescribed sectional shape by extruding the same from a die and thereafter solidifying the same by cooling. The material itself is supplied in the form of a pellet or the like similarly to thermoplastic resin, to be extremely easy to handle.

The TPU, requiring a far shorter molding cycle than the cast type urethane elastomer, having high mass productivity and requiring no milling or crosslinking step dissimilarly to the millable type urethane elastomer, is known as a material superior in moldability to the remaining ones.

However, the range of material selection for the thermoplastic elastomer urethane employed as the chief material for the TPU is limited due to the thermoplasticity, and the physical properties of the thermoplastic elastomer urethane represented by hardness are limited in particular. If the hardness of the thermoplastic elastomer urethane is reduced, mechanical strength such as abrasion resistance is reduced, or moldability such as a solidification rate in cooling after fusion molding is remarkably reduced. Therefore, the lower limit of the hardness of a generally usable thermoplastic elastomer urethane is set to 60 in microrubber hardness (type A) measured with a microrubber hardness tester "MD-1" by Kobunshi Keiki Co., Ltd., for example, under an environment having a temperature of 23±1° C. and relative humidity of 55±1%.

In other words, a TPU containing a soft thermoplastic elastomer urethane having microrubber hardness (type A) of less than 60 is not suitable for fusion molding. The TPU containing the soft thermoplastic elastomer urethane has such a low solidification rate that the same is not sufficiently solidified even if a molded product thereof is cooled to room temperature over a long cooling time after injection molding, for example, and easily deformed upon demolding. Even if the molded product can be demolded without deformation, abrasion resistance thereof is so inferior that precision in paper feeding is remarkably reduced due to a change in the outer diameter resulting from abrasion and a following chance in the feed rate. Therefore, a practicable paper feed roller cannot be formed by the TPU containing the soft thermoplastic elastomer urethane.

On the other hand, a TPU containing a hard thermoplastic elastomer urethane having microrubber hardness (type A) of not less than 60 does not cause the aforementioned problems. However, a paper feed roller formed by the TPU is not sufficiently deflected in paper feeding due to the hardness. Therefore, the paper feed roller already exhibits a low friction coefficient with respect to papers in an early stage of use, and cannot achieve excellent paper feeding.

In other words, one of important factors influencing the friction coefficient of the paper feed roller with respect to the papers is a large contact length (nip width) between the paper feed roller, brought into contact with the papers with a prescribed pressure and deflected, and the papers in the paper feeding direction. As the contact length is increased, the friction coefficient can be increased by increasing the contact area, expressed by the product of the contact length and the width of the papers orthogonal to the paper feeding direction, between the paper feed roller and the papers. In a conventional TPU containing a hard thermoplastic elastomer urethane, however, the contact length cannot be sufficiently increased.

In the case of an actual product, slight dimensional displacement of each component of the paper feed roller exerts an influence as deviation in the mounted position or the positions or angles of the paper feed roller and another roller. If the paper feed roller has high hardness, it is so difficult to absorb the deviation by deformation of the rubber that the deviation may exert a remarkable influence on the performance of the paper feed roller. If any component of the paper feed roller is deviated in inclination, for example, the papers may be slanted.

An object of the present invention is to provide a paper feed roller made of a TPU excellent in moldability and abrasion resistance and hardly causing reduction of the friction coefficient resulting from adhesion of paper dust, flexible, easily deflected when brought into contact with papers with a prescribed pressure, and provided with a high friction coefficient with respect to the papers from an early stage of use to hardly cause defective paper feeding over a long period from the early stage of use.

The paper feed roller according to the present invention is made of a thermoplastic elastomer composition (TPU) containing an ester thermoplastic elastomer urethane or an ether thermoplastic elastomer urethane (E) having microrubber hardness (type A) of not less than 60 and not more than 80 and a plasticizer (P) in a mass ratio E/P of 70/30 to 50/50.

According to the present invention, the microrubber hardness (type A) of the thermoplastic elastomer urethane is in the range of not less than 60 and not more than 80. Therefore, the thermoplastic elastomer urethane having the microrubber hardness in the aforementioned range and exhibiting excellent moldability and excellent abrasion resistance is so employed that a paper feed roller hardly allowing adhesion of aliphatic hydrocarbon or paper dust due to a high SP value specific to the thermoplastic elastomer urethane and not remarkably reducing the friction coefficient can be formed by arbitrary molding such as injection molding without causing a defect such as deformation resulting from insufficient solidification. Further, a paper feed roller hardly reducing precision in paper feeding by a change in the outer diameter or the like can be formed due to the excellent abrasion resistance.

In addition, the TPU is provided with proper flexibility due to the addition of the prescribed quantity of the plasticizer to the thermoplastic elastomer urethane. Therefore, the paper feed roller made of the TPU is flexible, easily deflected when brought into contact with papers with a prescribed pressure, and exhibits a high friction coefficient with respect to the papers from an early stage of use.

According to the present invention, therefore, a paper feed roller hardly causing defective paper feeding over a long period from the early stage of use can be formed.

When an ester thermoplastic elastomer urethane containing a soft segment having a polyester structure is employed, at least one plasticizer selected from a group consisting of mono- or more oxyalkylene glycol diester and phthalic diester having an oxyalkylene skeleton is preferably employed as the plasticizer. When an ether thermoplastic elastomer urethane containing a soft segment having a polyether structure is employed, on the other hand, at least one plasticizer selected from a group consisting of mono- or more oxyalkylene glycol diester and phthalic diester having an oxyalkylene skeleton, aliphatic dibasic acid diester having an oxyalkylene skeleton and phosphoric ester having an oxyalkylene skeleton is preferably employed as the plasticizer. According to such a combination of the thermoplastic elastomer urethane and the plasticizer, the friction coefficient with respect to the papers can be further improved by increasing the flexibility while maintaining the excellent abrasion resistance of the paper feed roller, as clearly understood from the results of Examples described later.

The thermoplastic elastomer urethane of any of the aforementioned types is synthesized by addition-polymerizing diisocyanate, macropolyol and a chain extender. The compounding ratio of the components constituting the addition polymer preferably satisfies the following formula (1):

$$20 \leq (x+z)/(x+y+z) \times 100 < 30 \qquad (1)$$

(where x, y and z represent the loadings of diisocyanate, macropolyol and the chain extender respectively). The compounding ratio of the components is so set in the aforementioned range that the microrubber hardness (type A) of the produced addition polymer, i.e., the thermoplastic elastomer urethane can be adjusted in the aforementioned range.

The rubber hardness of the thermoplastic elastomer urethane is defined by the microrubber hardness (type A) in the present invention since the rubber thickness may be so excessively small that the rubber hardness cannot be measured with a general spring rubber hardness tester in the paper feed roller according to the present invention made of the TPU containing the thermoplastic elastomer urethane and hence the rubber hardness is evaluated by the microrubber hardness (type A). The structure and the effects of the present invention can be further clarified by defining the rubber hardness of the thermoplastic elastomer urethane for the TPU forming the paper feed roller by the same microrubber hardness (type A).

The microrubber hardness (type A) is expressed by a value measured with the microrubber hardness tester "MD-1" by Kobunshi Keiki Co., Ltd. under the environment having the temperature of 23±1° C. and the relative humidity of 55±1%, as hereinabove described.

The microrubber hardness tester "MD-1" has been developed in order to measure the rubber hardness of a fine component or a thin sheet, which has been hard to measure with a conventional spring rubber hardness tester. In the type A, a measured value approximate to the spring A hardness defined in JIS K6301:1995 "physical testing methods for vulcanized rubber", i.e., the so-called JIS A hardness can be obtained by measuring the hardness under conditions of a load system of a cantilever plate spring, a cylindrical indenter having a diameter of 0.16 mm and a height of 0.5 mm, a pressure leg having an outer diameter of 4.0 mm and an inner diameter of 1.5 mm and spring loads of 22 mN (2.24 g) in 0 points and 332 mN (33.85 g) in 100 points.

More specifically, a sample is prepared by superposing four sheets of 2 mm in thickness singly made of the thermoplastic elastomer urethane whose hardness is to be measured. The indenter is pushed into the sample on five positions of the surface thereof in the thickness direction of the sheets, to obtain the average rubber hardness as the microrubber hardness (type A) of the thermoplastic elastomer urethane. Further, the indenter is pushed into the outer peripheral surface of the paper feed roller on five positions in the radial direction of the paper feed roller, to obtain the average rubber hardness as the microrubber hardness (type A) of the paper feed roller.

According to the present invention, the paper feed roller is made of the TPU excellent in moldability and abrasion resistance and hardly causing reduction of the friction coefficient resulting from adhesion of paper dust, flexible, easily deflected when brought into contact with papers with a prescribed pressure, and has a high friction coefficient with respect to the papers from an early stage of use. Therefore, the paper feed roller hardly causes defective paper feeding over a long period from the early stage of use.

The foregoing and other objects, features and effects of the present invention will become more apparent from the following detailed description of the embodiments with reference to the attached drawings.

DETAILED DESCRIPTION OF PREFERRED EMBODIMENTS (Thermoplastic Elastomer Composition)

A thermoplastic elastomer composition (TPU) for forming the paper feed roller according to the present invention contains an ester thermoplastic elastomer urethane or an ether thermoplastic elastomer urethane (E) having microrubber hardness (type A) of not less than 60 and not more than 80 and a plasticizer (P) in a mass ratio E/P of 70/30 to 50/50.

The microrubber hardness (type A) of the thermoplastic elastomer urethane is limited to not less than 60 and not more than 80 for the following reason: A TPU containing a soft thermoplastic elastomer urethane having microrubber hardness (type A) of less than 60 is solidified at a low rate, as described above. Therefore, a molded product of the TPU remains in a state not sufficiently solidified even if the same is cooled to room temperature over a long cooling time after injection molding, for example, and easily deformed after demolding. Even if the molded product can be demolded without deformation, the abrasion resistance is so inferior that the precision in paper feeding is remarkably reduced due to a change in the outer diameter resulting from abrasion and a following change in the feed rate, and hence a practicable paper feed roller cannot be formed.

On the other hand, the aforementioned problem does not arise when a TPU containing a hard thermoplastic elastomer urethane having microrubber hardness (type A) exceeding 80 is used. In this case, however, the plasticizer easily bleeds from the paper feed roller, to disadvantageously contaminate papers or the like.

When the microrubber hardness (type A) of the thermoplastic elastomer urethane is not less than 60 and not more than 80, a paper feed roller having excellent characteristics can be formed without causing the aforementioned problems.

According to the present invention, the mass ratio E/P of the thermoplastic elastomer urethane (E) and the plasticizer (P) is limited to 70/30 to 50/50 for the following reasons: If the content of the plasticizer exceeds the aforementioned range, the excess plasticizer bleeds from the paper feed roller to disadvantageously contaminate papers or the like. If the content of the plasticizer is less than the aforementioned range, on the other hand, the effect of the plasticizer providing flexibility to the paper feed roller cannot be attained, and a paper feed roller having a high friction coefficient in an initial stage of use cannot be formed.

When the mass ratio E/P of the thermoplastic elastomer urethane (E) and the plasticizer (P) is 70/30 to 50/50, a paper feed roller having excellent characteristics can be formed without causing the aforementioned problems. In order to form a paper feed roller having more excellent characteristics, the mass ratio E/P is preferably 70/30 to 60/40 in the aforementioned range.

The thermoplastic elastomer urethane is synthesized by addition-polymerizing diisocyanate, macropolyol and a chain extender, similarly to the prior art.

The diisocyanate can be prepared from not less than one or two of tolylene diisocyanate (TDI), 4,4'-diphenylmethane diisocyanate (MDI), 1,5-naphthylene diisocyanate (NDI), tolidine diisocyanate, 1,6-hexamethylene diisocyanate (HDI), isophorone diisocyanate (IPDI), xylylene diisocyanate (XDI), hydrogenated XDI, tetramethylxylene diisocyanate (TMXDI), 1,8-diisocyanate methyloctane and dicyclohexylmethane diisocyanate (hydrogenated MDI: HMDI). In particular, 4,4'-diphenylmethane diisocyanate (MDI) is preferable.

The macropolyol can be prepared from polyester polyol or polyether polyol. The number average molecular weight Mn of the macropolyol is preferably not less than 500 and not more than 5000, particularly preferably not less than 1000 and not more than 3000. When polyester polyol is employed as the macropolyol, an ester thermoplastic elastomer urethane containing a soft segment having a polyester structure is synthesized. When polyether polyol is employed as the macropolyol, on the other hand, an ether thermoplastic elastomer urethane containing a soft segment having a polyether structure is synthesized.

The polyester polyol can be obtained by dehydration condensation of not less than one or two of bivalent organic acid and acid ester thereof or an ester-forming derivative such as anhydride and not less than one or two aliphatic diols, for example.

The bivalent organic acid can be prepared from aliphatic dicarboxylic acid (succinic acid, glutaric acid, adipic acid, sebacic acid, azelaic acid or the like) having a carbon number of 4 to 12, aromatic dicarboxylic acid (phthalic acid, terephthalic acid, isophthalic acid, naphthalene dicarboxylic acid or the like) or cycloaliphatic dicarboxylic acid (hexahydrophthalic acid, hexahydroterephthalic acid, hexahydroisophthalic acid or the like), for example.

The aliphatic diol can be prepared from aliphatic diol having a carbon number of 2 to 10 such as ethylene glycol, 1,3-propylene glycol, 1,2-propylene glycol, 1,3-butanediol, 1,4-butanediol, 1,5-pentanediol, 1,6-hexanediol, 3-methyl-1,5-pentanediol, neopentyl glycol, 1,3-octanediol or 1,9-nonanediol, for example.

The polyester polyol can be prepared from polylactonediol obtained by ring-opening polymerization of a lactone monomer such as ε-caprolactone, for example.

The polyester polyol is preferably prepared from poly(hexanebutylene adipate).

On the other hand, the polyether polyol can be prepared from polyethylene glycol, polypropylene glycol or polytetramethylene glycol obtained by polymerizing cyclic ether such as ethylene oxide, propylene oxide or tetrahydrofuran, or not less than one or two copolyethers obtained by copolymerizing not less than two of such cyclic ethers, for example. In particular, polytetramethylene glycol is preferable.

The chain extender can be prepared from not less than one or two of aliphatic polyol, cycloaliphatic polyol and aromatic polyol, for example.

The aliphatic polyol can be prepared from not less than one or two of ethylene glycol, 1,3-propylene glycol, 1,2-propylene glycol, 1,3-butanediol, 1,4-butanediol, 1,5-pentanediol, 1,6-hexanediol, 3-methyl-1,5-pentanediol, neopentyl glycol, 1,8-octanediol, 1,9-nonanediol and diethylene glycol, for example.

The cycloaliphatic polyol can be prepared from 1,4-cyclohexane dimethanol, for example.

The aromatic polyol can be prepared from not less than one or two of 1,4-dimethylolbenzene, bisphenol A, an ethylene oxide adduct of bisphenol A and a propylene oxide adduct of bisphenol A, for example.

The chain extender can also be prepared from amine. The amine can be prepared from dicyclohexylmethyl methanediamine (hydrogenated MDA) or isophorone diamine (IPDA), for example.

The chain extender is preferably prepared from 1,4-butanediol.

With the aforementioned components, the thermoplastic elastomer urethane can be synthesized by a method similar to a conventional one. According to a one-shot method, for example, the thermoplastic elastomer urethane is synthesized by mixing the chain extender into the macropolyol previously dehydrated by heating under reduced pressure or the like, stirring the mixture under heating, adding separately heated diisocyanate and further stirring the mixture under heating for a constant time thereby addition-polymerizing the components. The synthesized thermoplastic elastomer urethane can be heated to a prescribed temperature to be annealed, pulverized and thereafter pelletized, to be employed as the raw material for the TPU.

Alternatively, a mixture obtained by mixing the components with one another by performing the addition polymerization in a batch system or a continuous system can be continuously extruded through an extruder, for example, or continuously transported on a conveyor belt, maintained at a temperature of not less than 40° C. and not more than 230° C., preferably not less than 70° C. and not more than 180° C. for a constant time, reacted and thereafter pelletized, to be employed as the raw material for the TPU.

The compounding ratio of the components is preferably in the range satisfying the formula (1):

$$20 \leq (x+z)/(x+y+z) \times 100 < 30 \quad (1)$$

(where x, y and z represent the loadings of diisocyanate, macropolyol and the chain extender respectively). The compounding ratio of the components is so set in the aforementioned range that the microrubber hardness (type A) of the produced thermoplastic elastomer urethane can be adjusted in the aforementioned range.

The TPU is preferably pelletized, in order to improve handleability etc. in injection molding or extrusion molding. A pellet of the TPU can be manufactured by supplying a pellet of the thermoplastic elastomer urethane as the raw material and the plasticizer to a double-screw extruder, for example, to be in the aforementioned prescribed mass ratio E/P, milling and continuously extruding the materials with the double-screw extruder and thereafter pelletizing the same again. The plasticizer may be measured with a gear pump, for example, and continuously supplied to the double-screw extruder.

Alternatively, a pellet of the TPU can be manufactured by blending a pellet of the thermoplastic elastomer urethane and the plasticizer with each other to be in the prescribed mass ratio E/P, storing the mixture in a container and heating the same for a constant time thereby impregnating the plasticizer into the pellet and thereafter pelletizing the mixture again while continuously extruding the same with an extruder.

The plasticizer can be prepared from not less than one or more well-known plasticizers such as an aliphatic dibasic acid plasticizer (including adipate and sebacate), a phosphoric acid plasticizer, a polyester plasticizer and a phthalic acid plasticizer.

A polyester plasticizer, particularly at least one plasticizer selected from a group consisting of mono- or more oxyalkylene glycol diester including monooxyalkylene glycol diesther, dioxyalkylene glycol diester, trioxyalkylene glycol diester or the like and phthalic diester having an oxyalkylene skeleton is suitable as the plasticizer employed along with the ester thermoplastic elastomer urethane. On the other hand, a polyether plasticizer, particularly at least one plasticizer selected from a group consisting of the mono- or more oxyalkylene glycol diester, phthalic diester having an oxyalkylene skeleton, aliphatic dibasic acid diester having an oxyalkylene skeleton and phosphoric ester having an oxyalkylene skeleton is suitable as the plasticizer employed along with the ether thermoplastic elastomer urethane.

The TPU can also contain various additives such as a filler, a hydrolysis inhibitor, an antioxidant and a colorant, for example, in addition to the components. The additives can be introduced into the TPU in an arbitrary stage from the synthesis of the thermoplastic elastomer urethane to the pelletization of the TPU.

For example, the hydrolysis inhibitor, employed for preventing the ester thermoplastic elastomer urethane from deterioration resulting from hydrolysis, can be previously added to the aforementioned reaction system for addition-polymerizing the diisocyanate, the polyester polyol and the chain extender.

The antioxidant, employed for preventing the ether thermoplastic elastomer urethane from deterioration resulting from oxidation, can be previously added to the aforementioned reaction system for addition-polymerizing the diisocyanate, the polyether polyol and the chain extender.

(Paper Feed Roller)

Figure 1:
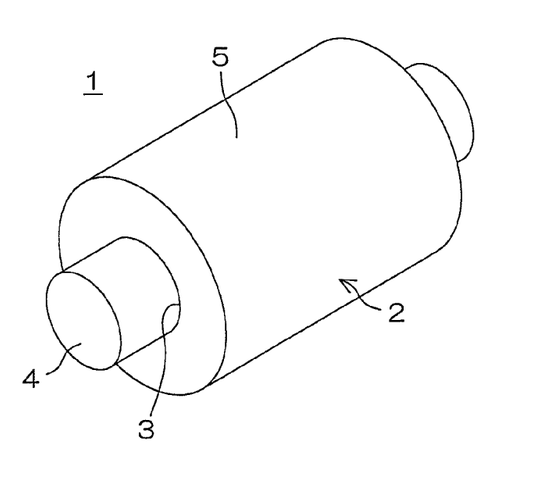
FIG. 1 is a perspective view showing a paper feed roller according to an embodiment of the present invention.

FIG. 1 is a perspective view showing an embodiment of the paper feed roller according to the present invention.

Referring to FIG. 1, a paper feed roller 1 according to the embodiment includes a cylindrical roller body 2 made of the TPU and a shaft 4 inserted into a through-hole 3 at the center of the roller body 2. The outer diameter of the shaft 4 is set to be greater than the inner diameter of the through-hole 3 not yet receiving the shaft 4. The shaft 4 is press-fitted into the through-hole 3, to be fixed to the roller body 2 and integrally rotated therewith. The shaft 4 is integrally made of a metal, a ceramic or hard resin, for example.

The rubber thickness of the roller body 2, not particularly restricted, is preferably not less than 1 mm and not more than 20 mm, particularly preferably not less than about 2 mm and not more than about 15 mm, in order to achieve excellent paper feeding when the paper feed roller 1 is employed for an electrostatic copier, for example. The roller body 2 is formed by arbitrary molding such as injection molding or extrusion molding with the TPU.

In the injection molding, the aforementioned pelletized TPU is milled in an injection molder along with arbitrary additives if necessary, heated and melted, injected into a mold corresponding to the cylindrical shape of the roller body 2, cooled, solidified and thereafter demolded, to form the roller body 2.

In the extrusion molding, on the other hand, the TPU is milled in an extrusion molder along with arbitrary additives if necessary, heated and melted, extruded into a long cylindrical shape through a die corresponding to the sectional shape of the roller body 2, i.e., an annular shape, cooled, solidified and thereafter cut into a prescribed length, to form the roller body 2.

Then, the shaft 4 is press-fitted into the through-hole 3 of the formed roller body 2. At an arbitrary time around the press-fitting, an outer peripheral surface 5 of the roller body 2 is polished to have prescribed surface roughness, the outer peripheral surface 5 is knurled or embossed, or both ends of the roller body 2 are cut so that the axial length of the roller body 2, i.e., the width of the paper feed roller 1 reaches a prescribed value. Thus, the paper feed roller 1 shown in FIG. 1 is manufactured.

The roller body 2 may have a two-layer structure including an outer layer on the side of the outer peripheral surface 5 and an inner layer on the side of the shaft 4. In this case, at least the outer layer may be made of the TPU.

Depending on the application of the paper feed roller 1, the through-hole 3 may be provided on a position eccentric to the roller body 2. The roller body 2 is not restricted to the cylindrical shape, but may have such a variant shape that the outer peripheral surface 5 is partially notched in a planar manner, for example. The roller body 2 may be directly molded into the variant shape by injection molding or extrusion molding, or the outer peripheral surface 5 of the cylindrically formed roller body 2 may be post-worked into the variant shape.

Alternatively, the cylindrically formed roller body 2 can be deformed into the variant shape by press-fitting the shaft 4, whose section is deformed into a shape corresponding to the variant shape, into the through-hole 3. In this case, the outer peripheral surface 5 can be polished, knurled or embossed in the state of the undeformed cylindrical roller body 2, whereby the workability can be improved.

The paper feed roller 1 according to the present invention can be employed as a paper feed roller such as a feed roller, a transport roller, a platen or a paper discharge roller built in a paper feed mechanism provided in an apparatus such as an electrostatic copier, a laser beam printer, a plain paper facsimile, an ink jet printer or an automatic teller machine (ATM), for example.

The rubber hardness of the paper feed roller 1 according to the present invention, i.e., the rubber hardness of the roller body 2 in the embodiment shown in FIG. 1, is preferably less than 60 in microrubber hardness (type A). If the microrubber hardness (type A) is not less than 60, the roller body 2 is not sufficiently deflected in paper feeding due to the hardness, and hence the friction coefficient thereof may be so low in an early stage of use that excellent paper feeding cannot be achieved. When the microrubber hardness (type A) of the roller body 2 is less than 60, on the other hand, excellent paper feeding can be achieved from the early stage of use without causing the problem.

The microrubber hardness (type A) of the roller body 2 is preferably not less than 40 in the aforementioned range. In order to set the microrubber hardness (type A) to less than 40, it may be necessary to use a thermoplastic elastomer urethane having microrubber hardness (type A) of less than 60 or to blend the plasticizer in a large quantity exceeding the mass ratio E/P of 50/50, and the aforementioned problem may be caused in each case.

The microrubber hardness (type A) of the roller body 2 is more preferably not less than 45 and not more than 50 in the aforementioned range, in order to form the paper feed roller having excellent characteristics without causing the aforementioned problem.

EXAMPLES

Synthetic Example 1

Poly(hexanebutylene adipate): number average molecular weight Mn=2000] as polyester polyol was heated to 110° C. under reduced pressure of 5 hPa and dehydrated for one hour.

Then, 105 parts by mass of 1,4-butanediol as a chain extender was mixed to 2000 parts by mass of the poly(hexanebutylene adipate) and the mixture was stirred under heating to 80° C., while 542 parts by mass of 4,4'-diphenylmethane diisocyanate as diisocyanate and 12 parts by mass of Stabaxol (registered trademark) I by Rhein Chemie Rheinau as a hydrolysis inhibitor were added to the mixture, which in turn was further continuously stirred.

When the reaction temperature reached 110° C., the mixture was poured onto a hot plate covered with glass fiber cloth processed with Teflon (registered trademark) and heated to 125° C., and the reaction product was annealed in a drying chamber of 100° C. for 15 hours, pulverized and thereafter pelletized, to prepare a pellet of an ester thermoplastic elastomer urethane.

A sample was prepared by superposing four sheets of 2 mm in thickness obtained from the pellet, and an indenter of a microrubber hardness tester (MD-1 by Kobunshi Keiki Co., Ltd.) was pushed into the sample on five positions of the surface thereof in the thickness direction of the sheets, to obtain the average rubber hardness as the microrubber hardness (type A) of the thermoplastic elastomer urethane. As a result, the microrubber hardness was 70. The compounding ratio of the components obtained according to the formula (1) was 24.4.

Synthetic Example 2

A pellet of an ester thermoplastic elastomer urethane was prepared similarly to synthetic example 1, except that the quantities of 1,4-butanediol and 4,4-diphenylmethane diisocyanate were set to 255 parts by mass and 959 parts by mass respectively. The microrubber hardness (type A) of the thermoplastic elastomer urethane obtained similarly to the above was 90. The compounding ratio of the components obtained according to the formula (1) was 37.8.

Synthetic Example 3

A pellet of an ester thermoplastic elastomer urethane was prepared similarly to synthetic example 1, except that the quantities of 1,4-butanediol and 4,4'-diphenylmethane diisocyanate were set to 161 parts by mass and 697 parts by mass respectively. The microrubber hardness (type A) of the thermoplastic elastomer urethane obtained similarly to the above was 80. The compounding ratio of the components obtained according to the formula (1) was 30.0.

Synthetic Example 4

A pellet of an ester thermoplastic elastomer urethane was prepared similarly to synthetic example 1, except that the quantities of 1,4-butanediol and 4,4'-diphenylmethane diisocyanate were set to 134 parts by mass and 621 parts by mass respectively. The microrubber hardness (type A) of the thermoplastic elastomer urethane obtained similarly to the above was 75. The compounding ratio of the components obtained according to the formula (1) was 27.4.

Synthetic Example 5

A pellet of an ester thermoplastic elastomer urethane was prepared similarly to synthetic example 1, except that the quantities of 1,4-butanediol and 4,4'-diphenylmethane diisocyanate were set to 45 parts by mass and 375 parts by mass respectively. The microrubber hardness (type A) of the thermoplastic elastomer urethane obtained similarly to the above was 50. The compounding ratio of the components obtained according to the formula (1) was 17.4.

Example 1

60 parts by mass of the pellet of the thermoplastic elastomer urethane prepared according to synthetic example 1 and 40 parts by mass of diisopropylene glycol dibenzoate (Benzoflex 988 (registered trademark) by Velsicol Chemical Corporation) were introduced into a pail and heated in an oven of 80° C. for 15 hours to impregnate the plasticizer into the pellet. Thereafter the total contents of the pail were supplied to a double-screw extruder (screw diameter: 30 mm, L/D: 36D, number of revolutions: 10 to 300 rpm), milled and continuously extruded with the double-screw extruder, and thereafter pelletized again to manufacture a pellet of the TPU. The mass ratio E/P of the thermoplastic elastomer urethane and the plasticizer was 60/40.

Then, the pellet was supplied to a 50-ton injection molder (by Sumitomo Heavy Industries, Ltd.). Then, the pellet was milled with the injection molder, injected into the mold in a heated and melted state, cooled, solidified and thereafter demolded to form a cylindrical roller body 2 having an outer diameter of 24.5 mm, an inner diameter of 13.3 mm and an axial length of 40 mm, as shown in FIG. 1. The roller body 2 was annealed in the oven of 80° C. for 15 hours after injection molding.

Then, a stainless steel shaft having a diameter of 14 mm was press-fitted into a through-hole 3 of the roller body 2, an outer peripheral surface 5 of the roller body 2 was polished until the outer diameter reached 24 mm, and the roller body 2 was cut into an axial length of 30 mm.

Then, a feed roller resin core for a composite machine (HP Laser Jet P4515n by Hewlett-Packard Japan, Ltd.) used in an abrasion resistance test described later was newly press-fitted into the through-hole 3 as the shaft 4 in place of the above shaft, to form a paper feed roller 1. The rubber thickness of the roller body 2 was 5 mm.

Examples 2 and 3 and Comparative Example 1

Pellets of TPUs were manufactured to form paper feed rollers 1 similarly to Example 1, except that the pellets of the thermoplastic elastomer urethanes prepared according to synthetic example 2 (comparative example 1), synthetic example 3 (Example 2) and synthetic example 4 (Example 3) were employed respectively. In each paper feed roller 1, the mass ratio E/P of the thermoplastic elastomer urethane and the plasticizer was 60/40.

Comparative Example 2

A paper feed roller 1 was formed similarly to Example 1, except that the soft pellet of the thermoplastic elastomer urethane, whose own microrubber hardness (type A) was less than 60, prepared according to synthetic example 5 was employed and no plasticizer was blended thereinto.

The characteristics of the pellets of the TPUs and the paper feed rollers 1 manufactured according to Examples 1 to 3 and comparative examples 1 and 2 were evaluated by conducting the following tests under an environment having a temperature of 23±1° C. and relative humidity of 55±1%.
(Moldability Test)

Each of the pellets of the TPUs manufactured according to Examples 1 to 3 and comparative examples 1 and 2 was supplied to the aforementioned injection molder. Then, the pellet was milled with the injection molder and injected into the mold in a heated and melted state, cooled, solidified and thereafter demolded to form a compressed ball defined in JIS K 6262:2006 "rubber, vulcanized or thermoplastic—determination of compression set at ambient, elevated or low temperatures", and a cooling time required to the compressed ball having a prescribed shape to be demoldable without deformation or the like was measured. The measurement conditions were set to a resin temperature of 190° C. and a mold temperature of 15° C. The moldability was evaluated with the following criteria:

○: The cooling time was less than 180 seconds, and the moldability was excellent.

Δ: The cooling time was not less than 180 seconds and less than 600 seconds, and the moldability was in the practical range.

x: The compressed ball was deformed in demolding even if the cooling time was not less than 600 seconds, and it was impossible to demold the compressed ball in a state keeping the prescribed shape. The moldability was inferior.
(Hardness Measurement)

The average rubber hardness of each of the paper feed rollers 1 formed according to Examples 1 to 3 and comparative examples 1 and 2 was obtained by pushing the indenter of the microrubber hardness tester (MD-1 by Kobunshi Keiki Co., Ltd.) into five positions of the outer peripheral surface 5 of the roller body 2 in the radial direction of the paper feed roller 1. The obtained average hardness was regarded as the microrubber hardness (type A) of the roller body 2.

(Abrasion Resistance Test)

Each of the paper feed rollers 1 formed according to Examples 1 to 3 and comparative examples 1 and 2 was set on the composite machine (HP Laser Jet P4515n by Hewlett-Packard Japan, Ltd.) after being weighed, and 100000 plain copy papers (product name: FLYING by Tianjin Hines Cultural Products Co., Ltd.; 161st, Anshan West Road, Nankai District, Tianjin, China) were fed therethrough. Thereafter, the paper feed roller 1 was reweighed to obtain abrasion loss resulting from the paper feeding, and the abrasion resistance was evaluated with the following criteria:

under conditions identical to the above respectively, thereby evaluating the presence or absence of bleeding with the following criteria:

○: The initial friction coefficient μ was not less than 0.6, and the rate of change of the friction coefficient μ after the aging tests was less than 0.3%. No bleeding was observed.

x: The initial friction coefficient μ was less than 0.6, or the rate of change of the friction coefficient μ after the aging tests was not less than 0.3%. Bleeding was observed.

Table 1 shows the results.

TABLE 1

| | | | Comp. Ex. 1 | Ex. 2 | EX. 3 | EX. 1 | Comp. Ex. 2 |
|---|---|---|---|---|---|---|---|
| Parts by Mass | Thermoplastic Elastomer Urethane | MD = 90 | 60 | — | — | — | — |
| | | MD = 80 | — | 60 | — | — | — |
| | | MD = 75 | — | — | 60 | — | — |
| | | MD = 70 | — | — | — | 60 | — |
| | | MD = 50 | — | — | — | — | 100 |
| | Plasticizer | Benzoflex | 40 | 40 | 40 | 40 | — |
| Evaluation | Moldability | | — | ○ | ○ | ○ | Δ |
| | Microrubber Hardness | | — | 55 | 52 | 47 | 50 |
| | Abrasion Resistance | | — | ○ | ○ | ○ | X |
| | Friction Coefficient | Initial Stage | — | 1.2 | 1.4 | 1.5 | 1.6 |
| | | After Durability Test | — | 1.0 | 1.0 | 1.2 | 0.6 |
| | Bleeding | | X | ○ | ○ | ○ | ○ |

MD: Microrubber Hardness (Type A)

○: The abrasion loss was not more than 300 mg, and the abrasion resistance was excellent.

x: The abrasion loss was in excess of 300 mg, and the abrasion resistance was inferior.

(Measurement of Friction Coefficient)

The roller body 2 of each of the paper feed rollers 1 formed according to Examples 1 to 3 and comparative examples 1 and 2 was brought into pressure contact with a surface of a Teflon flat plate, so set that the surface was horizontal, with a vertical load of 0.98N (=0.1 kgf) applied from above, and a rectangular measurement paper having a length of 210 mm in a paper feeding direction and a width of 60 mm in a direction orthogonal to the paper feeding direction was set between the paper feed roller 1 and the flat plate. The measurement paper was prepared by cutting a copy paper G&F500 by Canon Inc. into the aforementioned size.

Then, the paper feed roller 1 was rotated at a peripheral speed of 50 mm/sec. in the state brought into pressure contact with the surface of the flat plate with the vertical load of 0.98 N (=0.1 kgf) applied from above, and transport force F for the measurement paper was measured with a load cell. Then, a friction coefficient μ was obtained by multiplying the transport force F by 0.1. The transport force F was measured twice before the abrasion resistance test (in an initial stage) and after the abrasion resistance test (after a durability test).

(Bleeding Test)

The plasticizer generally bleeds when the roller body 2 is left under a high-temperature environment, and the friction coefficient μ is reduced when the plasticizer bleeds on the surface of the roller body 2. Therefore, the air heating aging test and the accelerated aging test A-1 (testing temperature: 70±1° C.) defined in JIS K6257:2003 "rubber, vulcanized or thermoplastic—determination of heat aging properties" were conducted on each of the paper feed rollers 1 formed according to Examples 1 to 3 and comparative examples 1 and 2 to evaluate the friction coefficient μ before and after the tests It has been recognized from the results of comparative example 1 shown in Table 1 that the plasticizer bleeds if the microrubber hardness (type A) of the thermoplastic elastomer urethane for the TPU exceeds 80. Therefore, a flexible roller body 2 whose microrubber hardness was less than 60 was not obtainable according to comparative example 1.

It has also been recognized from the results of comparative example 2 that the moldability as well as the abrasion resistance are reduced and the friction coefficient is remarkably reduced after the durability test if a soft thermoplastic elastomer urethane whose own microrubber hardness (type A) is less than 60 is singly employed.

On the other hand, it has been confirmed from the results of each of Examples 1 to 3 that the TPU prepared by blending the thermoplastic elastomer urethane having microrubber hardness (type A) of not less than 60 and not more than 80 and the plasticizer with each other has excellent moldability while the roller body 2 of the paper feed roller 1 formed by the TPU exhibits microrubber hardness (type A) of less than 60, is flexible and has an excellent friction coefficient while neither erroneously transporting nor slanting papers when the papers are fed therethrough, allows use over a long period due to excellent abrasion resistance and causes no bleeding of the plasticizer.

Examples 4 and 5

Pellets of TPUs were manufactured to form paper feed rollers 1 similarly to Example 1, except that polyethylene glycol diester (EB300 by Sanyo Chemical Industries, Ltd.) (Example 4) and bis(2-methoxyethyl)phthalate (DMEP, Example 5) were employed as plasticizers. In each TPU, the mass ratio E/P of the thermoplastic elastomer urethane and the plasticizer was 60/40.

The characteristics of the pellets of the TPUs and the paper feed rollers 1 manufactured according to Examples 4 and 5 were evaluated by conducting the aforementioned tests. Table 2 shows the results along with those of Example 1.

TABLE 2

|  |  |  | Ex. 1 | Ex. 4 | Ex. 5 |
|---|---|---|---|---|---|
| Parts by Mass | Thermoplastic Elastomer Urethane | MD = 70 | 60 | 60 | 60 |
|  | Plasticizer | Benzoflex | 40 | — | — |
|  |  | EB300 | — | 40 | — |
|  |  | DMEP | — | — | 40 |
| Evaluation | Moldability |  | ○ | ○ | ○ |
|  | Microrubber Hardness |  | 47 | 48 | 48 |
|  | Abrasion Resistance |  | ○ | ○ | ○ |
|  | Friction Coefficient | Initial Stage | 1.5 | 1.8 | 0.9 |
|  |  | After Durability Test | 1.2 | 1.2 | 0.8 |
|  | Bleeding |  | ○ | ○ | ○ |

MD: Microrubber Hardness (Type A)

It has been recognized from the results of Examples 1, 4 and 5 shown in Table 2 that mono- or more oxyalkylene glycol diester or phthalic diester having an oxyalkylene skeleton is preferable as the plasticizer combined with the ester thermoplastic elastomer urethane, in order to further improve the friction coefficient with respect to papers by improving the flexibility while maintaining the excellent abrasion resistance of the roller body 2 of the paper feed roller 1.

Examples 6 and 7 and Comparative Examples 3 and 4

Pellets of TPUs were manufactured to form paper feed rollers 1 similarly to Example 1, except that the mass ratio E/P of the pellet of the thermoplastic elastomer urethane prepared according to synthetic example 1 and diisopropylene glycol dibenzoate as a plasticizer was set to 80/20 (comparative example 3), 70/30 (Example 6), 50/50 (Example 7) and 40/60 (comparative example 4) respectively.

The characteristics of the pellets of the TPUs and the paper feed rollers 1 manufactured according to Examples 6 and 7 and comparative examples 3 and 4 were evaluated by conducting the aforementioned tests. Table 3 shows the results along with those of Example 1.

TABLE 3

|  |  |  | Comp. Ex. 3 | Ex. 6 | Ex. 1 | Ex. 7 | Comp. Ex. 4 |
|---|---|---|---|---|---|---|---|
| Parts by Mass | Thermoplastic Elastomer Urethane <E> | MD = 70 | 80 | 70 | 60 | 50 | 40 |
|  | Plasticizer <P> | Benzoflex | 20 | 30 | 40 | 50 | 60 |
|  | Mass Ratio E/P |  | 80/20 | 70/30 | 60/40 | 50/50 | 40/60 |
| Evaluation | Moldability |  | ○ | ○ | ○ | ○ | — |
|  | Microrubber Hardness |  | 60 | 57 | 47 | 40 | — |
|  | Abrasion Resistance |  | ○ | ○ | ○ | ○ | — |
|  | Friction Coefficient | Initial Stage | 1.3 | 1.3 | 1.5 | 1.8 | — |
|  |  | After Durability Test | 1.0 | 1.0 | 1.2 | 1.2 | — |
|  | Bleeding |  | ○ | ○ | ○ | ○ | X |

MD: Microrubber Hardness (Type A)

It has been recognized from the results of comparative example 3 shown in Table 3 that the microrubber hardness (type A) of the roller body 2 cannot be set to less than 60. When the paper feed roller 1 having the roller body 2 according to comparative example 3 was set on the aforementioned composite machine and papers were fed therethrough, the papers were slanted.

According to comparative example 4, the quantity of the plasticizer was so excessive with the mass ratio E/P of 40/60 that the excess plasticizer bled. Therefore, the tests other than the bleeding test were not conducted.

On the other hand, it has been confirmed from the results of each of Examples 1, 6 and 7 that the TPU having the mass ratio E/P of 70/30 to 50/50 has excellent moldability and the roller body 2 of the paper feed roller 1 formed by the TPU exhibits microrubber hardness (type A) of less than 60, is flexible and has an excellent friction coefficient while neither erroneously transporting nor slanting papers when the papers are fed therethrough, allows use over a long period due to the excellent abrasion resistance and causes no bleeding of the plasticizer.

Synthetic Example 6

Polytetramethylene glycol (number average molecular weight Mn=2000) as polyether polyol was heated to 110° C. under reduced pressure of 5 hPa and dehydrated for one hour.

Then, 105 parts by mass of 1,4-butanediol as a chain extender was mixed into 2000 parts by mass of the polytetramethylene glycol and the mixture was stirred under heating to 80° C., while 542 parts by mass of 4,4'-diphenylmethane diisocyanate as diisocyanate and 13 parts by mass of Irganox 1010 (registered trademark) by Ciba Japan K.K. as an antioxidant separately heated to 50° C. were added to the mixture, which in turn was further continuously stirred.

When the reaction temperature reached 110° C., the mixture was poured onto a hot plate covered with glass fiber cloth processed with Teflon and heated to 125° C., and the reaction product was annealed in a drying chamber of 100° C. for 15 hours, pulverized and thereafter pelletized, to prepare a pellet of an ether thermoplastic elastomer urethane.

The microrubber hardness (type A) of the thermoplastic elastomer urethane obtained similarly to the above was 70. The compounding ratio of the components obtained according to the formula (1) was 24.4.

Synthetic Example 7

A pellet of an ether thermoplastic elastomer urethane was prepared similarly to synthetic example 6, except that the quantities of 1,4-butanediol and 4,4'-diphenylmethane diisocyanate were set to 255 parts by mass and 959 parts by mass respectively. The microrubber hardness (type A) of the thermoplastic elastomer urethane obtained similarly to the above was 90. The compounding ratio of the components obtained according to the formula (1) was 37.8.

Synthetic Example 8

A pellet of an ether thermoplastic elastomer urethane was prepared similarly to synthetic example 6, except that the quantities of 1,4-butanediol and 4,4'-diphenylmethane diisocyanate were set to 161 parts by mass and 697 parts by mass respectively. The microrubber hardness (type A) of the thermoplastic elastomer urethane obtained similarly to the above was 80. The compounding ratio of the components obtained according to the formula (1) was 30.0.

Synthetic Example 9

A pellet of an ether thermoplastic elastomer urethane was prepared similarly to synthetic example 6, except that the quantities of 1,4-butanediol and 4,4'-diphenylmethane diisocyanate were set to 134 parts by mass and 621 parts by mass respectively. The microrubber hardness (type A) of the thermoplastic elastomer urethane obtained similarly to the above was 75. The compounding ratio of the components obtained according to the formula (1) was 27.4.

Synthetic Example 10

A pellet of an ether thermoplastic elastomer urethane was prepared similarly to synthetic example 6, except that the quantities of 1,4-butanediol and 4,4'-diphenylmethane diisocyanate were set to 45 parts by mass and 376 parts by mass respectively. The microrubber hardness (type A) of the thermoplastic elastomer urethane obtained similarly to the above was 50. The compounding ratio of the components obtained according to the formula (1) was 17.4.

Example 8

60 parts by mass of the pellet of the thermoplastic elastomer urethane prepared according to synthetic example 6 and 40 parts by mass of diisopropylene glycol dibenzoate (the aforementioned Benzoflex 988) as a plasticizer were introduced into a pail and heated in an oven of 80° C. for 15 hours to impregnate the plasticizer into the pellet. Thereafter the total contents of the pail were supplied to a double-screw extruder (screw diameter: 30 mm, L/D: 36D, number of revolutions: 10 to 300 rpm), milled and continuously extruded with the double-screw extruder, and thereafter pelletized again to manufacture a pellet of the TPU. The mass ratio E/P of the thermoplastic elastomer urethane and the plasticizer was 60/40.

Then, the pellet was supplied to a 50-ton injection molder (by Sumitomo Heavy Industries, Ltd.), milled with the injection molder, injected into the mold in a heated and melted state, cooled, solidified and thereafter demolded to form a cylindrical roller body 2 having an outer diameter of 24.5 mm, an inner diameter of 13.3 mm and an axial length of 40 mm, as shown in FIG. 1. The roller body 2 was annealed in the oven of 80° C. for 15 hours after injection molding.

Then, a stainless steel shaft having a diameter of 14 mm was press-fitted into a through-hole 3 of the roller body 2, an outer peripheral surface 5 of the roller body 2 was polished until the outer diameter reached 24 mm, and the roller body 2 was cut into an axial length of 30 mm.

Then, a feed roller resin core for the aforementioned composite machine was press-fitted into the through-hole 3 as a shaft 4 in place of the above shaft, to form a paper feed roller 1. The rubber thickness of the roller body 2 was 5 mm.

Examples 9 and 10 and Comparative Example 5

Pellets of TPUs were manufactured to form paper feed rollers 1 similarly to Example 8, except that the pellets of the thermoplastic elastomer urethanes prepared according to synthetic example 7 (comparative example 5), synthetic example 8 (Example 9) and synthetic example 9 (Example 10) were employed respectively. In each paper feed roller 1, the mass ratio E/P of the thermoplastic elastomer urethane and the plasticizer was 60/40.

Comparative Example 6

A paper feed roller 1 was formed similarly to Example 8, except that the soft pellet of the thermoplastic elastomer urethane, whose own microrubber hardness (type A) was less than 60, prepared according to synthetic example 10 was employed and no plasticizer was blended thereinto.

The characteristics of the pellets of the TPUs and the paper feed rollers 1 manufactured according to Examples 9 and 10 and comparative examples 5 and 6 were evaluated by conducting the aforementioned tests. Table 4 shows the results.

TABLE 4

|  |  |  | Comp. Ex. 5 | Ex. 9 | Ex. 10 | Ex. 8 | Comp. Ex. 6 |
|---|---|---|---|---|---|---|---|
| Parts by Mass | Thermoplastic Elastomer Urethane | MD = 90 | 60 | — | — | — | — |
|  |  | MD = 80 | — | 60 | — | — | — |
|  |  | MD = 75 | — | — | 60 | — | — |
|  |  | MD = 70 | — | — | — | 60 | — |
|  |  | MD = 50 | — | — | — | — | 100 |
|  | Plasticizer | Benzoflex | 40 | 40 | 40 | 40 | — |
| Evaluation | Moldability |  | — | ○ | ○ | ○ | Δ |
|  | Microrubber Hardness |  | — | 56 | 52 | 47 | 50 |
|  | Abrasion Resistance |  | — | ○ | ○ | ○ | X |
|  | Friction Coefficient | Initial Stage | — | 1.2 | 1.4 | 1.5 | 1.6 |
|  |  | After Durability Test | — | 1.0 | 1.1 | 1.2 | 0.6 |
|  | Bleeding |  | X | ○ | ○ | ○ | ○ |

MD: Microrubber Hardness (Type A)

It has been recognized from the results of comparative example 5 shown in Table 4 that the plasticizer bleeds if the microrubber hardness (type A) of the thermoplastic elastomer urethane forming the TPU exceeds 80. Therefore, a flexible roller body 2 whose microrubber hardness was less than 60 was not obtainable according to comparative example 5.

It has also been recognized from the results of comparative example 6 that the moldability as well as the abrasion resistance are reduced and the friction coefficient is remarkably reduced after the durability test if a soft thermoplastic elastomer urethane whose microrubber hardness (type A) is less than 60 is singly employed.

On the other hand, it has been confirmed from the results of each of Examples 8 to 10 that the TPU prepared by blending the thermoplastic elastomer urethane having microrubber hardness (type A) of not less than 60 and not more than 80 and the plasticizer with each other has excellent moldability while the roller body 2 of the paper feed roller 1 formed by the TPU exhibits microrubber hardness (type A) of less than 60, is flexible and has an excellent friction coefficient while neither erroneously transporting nor slanting papers when the papers are fed therethrough, allows use over a long period due to the excellent abrasion resistance and causes no bleeding of the plasticizer.

Examples 11 to 14

Pellets of TPUs were manufactured to form paper feed rollers 1 similarly to Example 8, except that polyethylene glycol diester (the aforementioned EB 300, Example 11), bis(2-methoxyethyl)phthalate (DMEP, Example 12), diisodecyl adipate (DIDA, Example 13) and tributhoxyethyl phosphate (TBEP, Example 14) were employed as plasticizers. In each of the paper feed rollers 1, the mass ratio E/P of the thermoplastic elastomer urethane and the plasticizer was 60/40.

The characteristics of the pellets of the TPUs and the paper feed rollers 1 manufactured according to Examples 11 to 14 were evaluated by conducting the aforementioned tests. Table 5 shows the results along with those of Example 8.

TABLE 5

| | | | Ex. 8 | Ex. 11 | Ex. 12 | Ex. 13 | Ex. 14 |
|---|---|---|---|---|---|---|---|
| Parts by Mass | Thermoplastic Elastomer Urethane | MD = 70 | 60 | 60 | 60 | 60 | 60 |
| | Plasticizer | Benzoflex | 40 | — | — | — | — |
| | | EB300 | — | 40 | — | — | — |
| | | DMEP | — | — | 40 | — | — |
| | | DIDA | — | — | — | 40 | — |
| | | TBEP | — | — | — | — | 40 |
| Evaluation | Moldability | | ○ | ○ | ○ | ○ | ○ |
| | Microrubber Hardness | | 47 | 47 | 47 | 48 | 48 |
| | Abrasion Resistance | | ○ | ○ | ○ | ○ | ○ |
| | Friction Coefficient | Initial Stage | 1.5 | 1.5 | 1.5 | 0.9 | 0.9 |
| | | After Durability Test | 1.2 | 1.2 | 1.2 | 0.8 | 0.8 |
| | Bleeding | | ○ | ○ | ○ | ○ | ○ |

MD: Microrubber Hardness (Type A)

It has been recognized from the results of Examples 8 and 11 to 14 shown in Table 5 that mono- or more oxyalkylene glycol diester, phthalic diester having an oxyalkylene skeleton, aliphatic dibasic acid diester having an oxyalkylene skeleton or phosphoric ester having an oxyalkylene skeleton is preferable as the plasticizer combined, with the ester thermoplastic elastomer urethane, in order to further improve the friction coefficient with respect to papers by improving the flexibility while maintaining the excellent abrasion resistance of the roller body 2 of the paper feed roller 1.

Examples 15 and 16 and Comparative Examples 7 and 8

Pellets of TPUs were manufactured to form paper feed rollers 1 similarly to Example 8, except that the mass ratio E/P of the thermoplastic elastomer urethane prepared according to synthetic example 6 and diisopropylene glycol dibenzoate as a plasticizer was set to 80/20 (comparative example 7), 70/30 (Example 15), 50/50 (Example 16) and 40/60 (comparative example) respectively.

The characteristics of the pellets of the TPUs and the paper feed rollers 1 manufactured according to Examples 15 and 16 and comparative examples 7 and 8 were evaluated by conducting the aforementioned tests. Table 6 shows the results along with those of Example 8.

TABLE 6

| | | | Comp. Ex. 7 | EX. 15 | EX. 8 | EX. 16 | Comp. Ex. 8 |
|---|---|---|---|---|---|---|---|
| Parts by Mass | Thermoplastic Elastomer Urethane <E> | MD = 70 | 80 | 70 | 60 | 50 | 40 |
| | Plasticizer <P> | Benzoflex | 20 | 30 | 40 | 50 | 60 |
| | Mass Ratio E/P | | 80/20 | 70/30 | 60/40 | 50/50 | 40/60 |
| Evaluation | Moldability | | ○ | ○ | ○ | ○ | — |
| | Microrubber Hardness | | 60 | 56 | 47 | 41 | — |
| | Abrasion Resistance | | ○ | ○ | ○ | ○ | — |
| | Friction Coefficient | Initial Stage | 1.3 | 1.3 | 1.5 | 1.8 | — |
| | | After Durability Test | 1.0 | 1.1 | 1.2 | 1.2 | — |
| | Bleeding | | ○ | ○ | ○ | ○ | X |

MD: Microrubber Hardness (Type A)

It has been recognized from the results of comparative example 7 shown in Table 6 that the microrubber hardness (type A) of the roller body 2 cannot be set to less than 60 with the mass ratio E/P of 80/20, due to the insufficient quantity of the plasticizer. When the paper feed roller 1 having the roller body 2 according to comparative example 7 was set on the aforementioned composite machine and papers were fed therethrough, the papers were slanted.

According to comparative example 8, the quantity of the plasticizer was so excessive with the mass ratio E/P of 40/60 that the excess plasticizer bled. Therefore, the tests other than the bleeding test were not conducted.

On the other hand, it has been confirmed from the results of each of Examples 8, 15 and 16 that the TPU having the mass ratio E/P of 70/30 to 50/50 has excellent moldability while the roller body 2 of the paper feed roller 1 formed by the TPU exhibits microrubber hardness (type A) of less than 60, is flexible and has an excellent friction coefficient while neither erroneously transporting nor slanting papers when the papers are fed therethrough, allows use over a long period due to excellent abrasion resistance and causes no bleeding of the plasticizer.

While the present invention has been described in detail by way of the embodiments thereof, it should be understood that these embodiments are merely illustrative of the technical principles of the present invention but not limitative of the invention. The spirit and scope of the present invention are to be limited only by the appended claims.

This application corresponds to Japanese Patent Application No. 2009-185746 filed with the Japan Patent Office on Aug. 10, 2009, the disclosure of which is incorporated herein by reference.

What is claimed is:

1. A paper feed roller comprising a roller body made of a thermoplastic elastomer composition containing an ester thermoplastic elastomer urethane containing a polyurethane structure and a polyester structure in the molecules or an ether thermoplastic elastomer urethane containing a polyurethane structure and a polyether structure in the molecules (E) having microrubber hardness (type A) of not less than 60 and not more than 80 and a plasticizer (P) in a mass ratio E/P of 70/30 to 50/50, wherein
   the thermoplastic elastomer urethane is an addition polymer of a diisocyanate, a macropolyol and a chain extender, and the compounding ratio of the components constituting the addition polymer satisfies the following formula (I):

$$20 \leq (x+z)/(x+y+z) \times 100 < 30 \quad (1)$$

wherein x, y and z represent the loadings of the diisocyanate, the macropolyol and the chain extender, respectively, and
   the roller body has a microrubber hardness (type A) of less than 60.

2. The paper feed roller according to claim 1, wherein the thermoplastic elastomer urethane is the ester thermoplastic elastomer urethane, and the plasticizer is at least one selected from a group consisting of mono- or more oxyalkylene glycol diester and phthalic diester having an oxyalkylene skeleton.

3. The paper feed roller according to claim 2, wherein the mono- or more oxyalkylene glycol diester is at least one selected from a group consisting of dipropylene glycol dibenzoate and polyethylene glycol diester.

4. The paper feed roller according to claim 1, wherein the thermoplastic elastomer urethane is the ether thermoplastic elastomer urethane, and the plasticizer is at least one selected from a group consisting of mono- or more oxyalkylene glycol diester, phthalic diester having an oxyalkylene skeleton, aliphatic dibasic acid diester having an oxyalkylene skeleton and phosphoric ester having an oxyalkylene skeleton.

5. The paper feed roller according to claim 4, wherein the mono- or more oxyalkylene glycol diester is at least one selected from a group consisting of dipropylene glycol dibenzoate and polyethylene glycol diester.

6. The paper feed roller according to claim 1, wherein the macropolyol has a number average molecular weight of 500 to 5000.

7. The paper feed roller according to claim 1, wherein the roller body has microrubber hardness (type A) not less than 40 and less than 60.

* * * * *